US009421579B2

(12) United States Patent
Caillon et al.

(10) Patent No.: US 9,421,579 B2
(45) Date of Patent: Aug. 23, 2016

(54) METHOD OF MERGING A POSTAL ARTICLE INTO SORTED MAIL, THE METHOD INCLUDING ASSISTANCE VIA VISUAL DESIGNATION OF THE LOCATION AT WHICH THE POSTAL ARTICLE IS TO BE INSERTED

(71) Applicant: SOLYSTIC, Bagneux (FR)

(72) Inventors: Christophe Caillon, Bretigny sur Orge (FR); Eric Moullard, Portes les Valence (FR); Mohammed Ghezal, Tullins (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 14/130,173

(22) PCT Filed: Nov. 20, 2013

(86) PCT No.: PCT/FR2013/052805

§ 371 (c)(1),
(2) Date: Dec. 30, 2013

(87) PCT Pub. No.: WO2014/087069

PCT Pub. Date: Jun. 12, 2014

(65) Prior Publication Data

US 2015/0266063 A1 Sep. 24, 2015

(30) Foreign Application Priority Data

Dec. 6, 2012 (FR) ...................................... 12 61716

(51) Int. Cl.

*G06K 9/00* (2006.01)
*B07C 7/00* (2006.01)
*B07C 3/00* (2006.01)
*G06F 7/00* (2006.01)

(52) U.S. Cl.

CPC . *B07C 7/005* (2013.01); *B07C 3/00* (2013.01); *B07C 2301/0083* (2013.01)

(58) Field of Classification Search

USPC ......... 382/100–103, 106–107, 112, 119–123, 382/137–141, 155, 162, 168, 173, 181–189, 382/199, 209, 212, 219–220, 224, 232, 254, 382/266, 274, 276, 305, 312, 321, 258; 700/224, 214; 209/552; 194/207; 347/14

See application file for complete search history.

(56) References Cited

U.S. PATENT DOCUMENTS

2005/0150740 A1* 7/2005 Finkenzeller .......... B42D 25/29 194/207
2010/0231626 A1* 9/2010 Teluob ...................... B07C 1/00 347/14
2010/0332020 A1* 12/2010 Kechel ...................... B07C 3/02 700/214
2011/0046775 A1* 2/2011 Bailey ....................... B07C 3/00 700/224
2014/0284254 A1* 9/2014 Berdelle-Hilge ......... B07C 3/02 209/552

* cited by examiner

*Primary Examiner* — Seyed Azarian

(74) *Attorney, Agent, or Firm* — Vidas, Arrett & Steinkraus, P.A.

(57) ABSTRACT

A method of merging a postal article (3) with machine-sorted mail arriving in a stack and on edge in an ordered sequence of mail articles (12), the method comprising steps consisting firstly in forming a digital image of said postal article (3), the image including a postal delivery address (6), then, on the basis of data produced in said sorting machine and of said digital image, in determining in said ordered sequence of mail articles (12) a location at which said postal article (3) is to be inserted in order to perform the merging, and finally in generating an identification signal that visually designates said location directly in the stack so as to assist an operator (5) with performing said merging.

5 Claims, 2 Drawing Sheets

METHOD OF MERGING A POSTAL ARTICLE INTO SORTED MAIL, THE METHOD INCLUDING ASSISTANCE VIA VISUAL DESIGNATION OF THE LOCATION AT WHICH THE POSTAL ARTICLE IS TO BE INSERTED

CROSS-REFERENCE TO RELATED APPLICATIONS

This application is a national stage application of PCT/FR2013/052805, filed on Nov. 20, 2013 and claiming priority to FR 12 61716 filed on Dec. 6, 2012

TECHNICAL FIELD

The invention relates to the field of postal sorting, and, in particular to the field of assistance in merging postal articles with machine-sorted mail, it being possible, for example, for the postal articles to be mail articles that are not machine-sortable.

PRIOR ART

Patent Document DE-10 2010 043 389 discloses a method of merging a postal article with machine-sorted mail that is in the form of an ordered sequence of mail articles. In that method, merging assistance is given to the operator who is assigned the task of performing the merging. That operator assistance consists in displaying on a display screen placed next to the operator the image of the reference mail article that, in the sequence, should precede or that should follow the postal article to be merged. For that purpose, a camera is used to take a digital image of the postal article to be merged, and said reference mail article is determined on the basis of the data produced in the sorting machine during the automatic sorting of the mail articles, and also on the basis of the sorting plan that corresponds to the ordering of said mail articles in the sequence. Then the operator looks through the sequence of mail articles until said operator visually identifies the reference mail article, whereupon said operator can insert the postal article at the right place in the ordered sequence of the mail articles.

The proportion of automatically machine-sorted mail is increasing relative to the proportion of postal articles to be merged manually because sorting equipment is ever-improving, and the operation of manually looking through the sequence of already sorted mail articles is therefore becoming increasingly lengthy and tedious.

In addition, such manual merging is currently performed for preparing delivery rounds or "postman's walks". In practice, it is the delivery person who performs the merging because of that person's knowledge of the delivery plan for the mail articles, and thus the merging is generally performed in an inward delivery post office. There is a need to avoid requiring the operator assigned the task of merging postal articles into already machine-sorted mail to be a specialist, in order to reduce the costs of that manual operation and in order to make it possible for it to be performed in outward sorting centers.

An object of the invention is thus to remedy the drawbacks and to satisfy the expectations indicated above.

SUMMARY OF THE INVENTION

The invention therefore provides a method of merging a postal article with machine-sorted mail arriving in a stack and on edge in an ordered sequence of mail articles, the method being characterized in that it consists in forming a digital image of said postal article, the image including a postal delivery address, and, on the basis of data produced in said sorting machine and of said digital image, in determining in said ordered sequence of mail articles a location at which said postal article is to be inserted in order to perform the merging, and in that it further consists in generating an identification signal that visually designates said location directly in the stack so as to assist an operator in performing said merging.

The basic idea of the invention is thus to show the operator the place where the operator is to insert the postal article into the sequence of already sorted mail articles, via a signal that visually indicates the place to the operator.

The merging-assistance method of the invention may advantageously have the following features:

- data representative of the thickness of each mail article is used to generate said identification signal;
- the thickness data is data produced by the sorting machine;
- at least one physical magnitude of said stack is used to generate said identification signal;
- the identification signal is a light signal;
- the light signal is generated by a light source of the laser source type disposed substantially above the mail articles, the light signal being aimed at one of the mail articles marking the insertion location;
- the light signal is generated from a strip of light-emitting diodes (LEDs) along which the mail articles are disposed on edge and in a stack, a LED emitting the light signal marking the location in the stack;
- the postal article is merged with mail articles in order to prepare a delivery round; and
- on the basis of each digital image of an article, an image signature serving as a unique identifier for uniquely identifying said article is computed.

It can be understood that the term "postal article" may mean a letter, a magazine, a large-format postal article or "flat", or indeed a parcel of the packet type.

In the meaning of the invention, said postal article has not been machine-sorted automatically, e.g. because of its physical characteristics (too large, too heavy, etc.). But such a postal article may also be a mail article that is machine-sortable but that it has not been possible to sort automatically. The mail articles may be letters, magazines, and the like that are automatically sorted in conventional sorting machines having unstackers and sorting conveyors with sorting outlets.

BRIEF DESCRIPTION OF THE DRAWINGS

The present invention can be better understood and other advantages appear on reading the following description and on examining the accompanying drawings, in which.

DESCRIPTION

Figure 1:
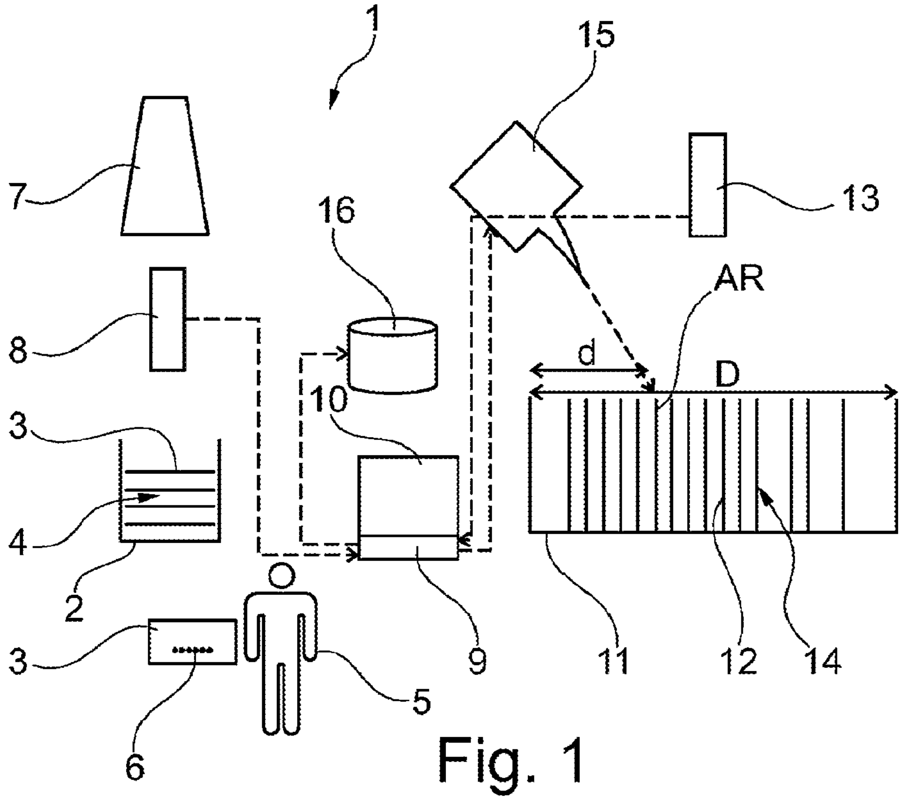
FIG. 1 shows an implementation of the merging method of the invention.

FIG. 1 shows an implementation of the method of merging postal articles with machine-sorted mail by using merging-assistance apparatus indicated by reference 1.

The merging-assistance apparatus 1 comprises, for example, a container 2 such as a storage bin designed to store flat the postal articles 3 to be merged. Said postal articles 3 are disposed in a stack 4 in the container 2. In this example, said postal articles 3 may be flat postal articles of large format or "flats". The top of the container 2 is normally open so as to allow an operator 5 to take the postal articles 3 one-by-one easily and rapidly from the top of the stack 4. The postal articles 3 are stored in the container 2 with their faces that bear the postal delivery addresses 6 facing upwards towards a camera or any other equivalent image-taking apparatus 8, the first postal article 3 of the stack being illuminated by lighting apparatus 7.

The image-taking apparatus 8 is thus normally placed above the container 2 so as to take digital images of each postal article 3 at the top of the stack 4, each digital image then including the delivery address 6 on the postal article 3. It should be noted that the image-taking apparatus may also be a movable camera of the handheld barcode reader type.

The merging-assistance apparatus 1 also includes a monitoring and control unit 9 that is connected to the image-taking apparatus 8 and that includes an optical character recognition system of the OCR type designed for automatically evaluating the delivery address 6 in the digital image of each postal article 3 as is well known.

The monitoring and control unit 9 may be connected to a display screen 10, e.g. a touch-sensitive screen having a virtual keyboard or a physical keyboard.

The merging-assistance apparatus 1 may also include a plane support 11 having a dihedral and on which mail articles 12 that are already sorted in an ordered sequence can be disposed on edge in a stack. In FIG. 1, reference 13 designates apparatus making it possible to measure physical size dimensions, in particular the length D of the stack 14 of mail articles 12. The apparatus 13 may, for example, be a camera that produces an image of the stack and that is placed above the support 11 at a known distance from the monitoring and control unit 9. By computing and image analysis, the monitoring and control unit 9 is thus suitable for determining an estimate of the length D of the stack 14.

The merging-assistance apparatus 1 may also include identification means 15 suitable for generating a reference signal that visually designates a location at which a postal article 3 to be merged is to be inserted into the stack 14 of mail articles 12. The identification means 15 may be an angularly positionable laser controlled by the monitoring and control unit 9. In practice, the laser 15 is suitable for generating a light beam that comes to be placed, for example, on the top edge face of a mail article 12 in the stack 14 so as to designate the insertion location (before or after said mail article 12).

In FIG. 1, reference 16 designates a database that contains the data produced by the sorting machine or equipment while the mail articles 12 are being sorted. Said data includes, for each mail article 12, an image of the mail article 12 that includes a postal delivery address, physical characteristics of the mail article 12 such as length, height, thickness, plastic wrapping, etc. Said data may also include an indication of rank of the mail article 12 in a sequence of mail articles, an indication of a delivery point in the delivery round, etc. All of this data is archived conventionally while the mail is being sorted in an automatic postal sorting machine.

Figure 3:
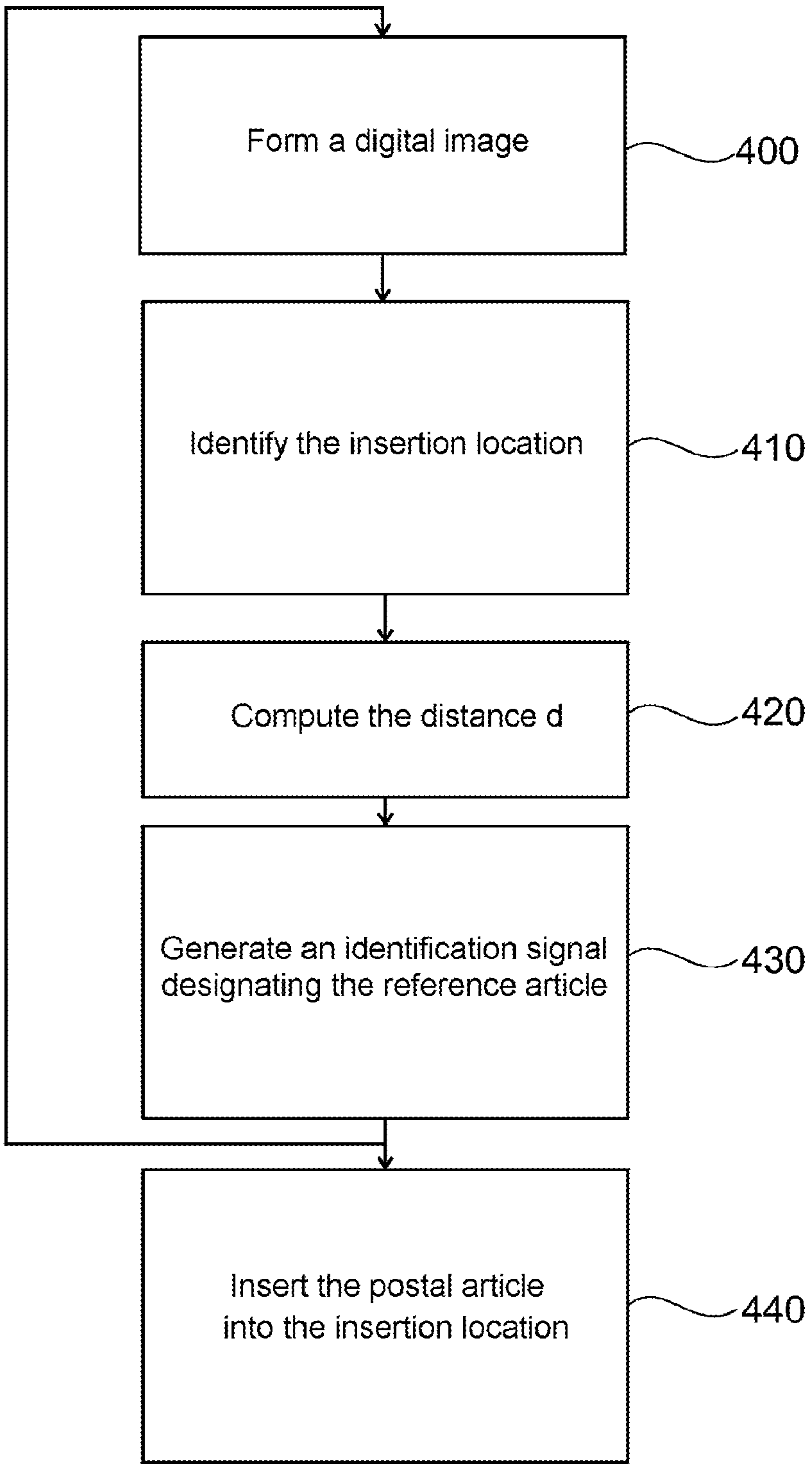
FIG. 3 is a flow chart showing the main steps of the method of the invention.

FIG. 3 shows the main steps in the merging method of the invention using the merging-assistance apparatus 1 shown in FIG. 1.

At the start of the merging process, the operator 5 actuates a cyclical merging process, e.g. by pressing a key.

The cycle starts with a step 400 of forming a digital image of the current postal article 3 at the top of the stack 4.

Said digital image is stored in a memory in the monitoring and control unit 9, which evaluates the delivery address contained in the image via OCR processing. The evaluation may optionally involve remote recognition by video encoding.

In step 410, the monitoring and control unit 9 continues its processing for determining an insertion location for the current postal article 3 in the sequence of the mail articles 12 by using the address recognized for the postal article 3 and the data in the database 16, and the sorting plan that defines the ordering in the sequence of the mail articles 12. In particular, the monitoring and control unit 9 is suitable for identifying, on the basis of said information, the reference mail article 12 that should precede or follow the postal article 3 to be merged.

In step 420, on the basis of the identification of the reference mail article 12 and on the basis of the data in the database 16, the monitoring and control unit 9 is suitable for computing the distance d between said reference mail article 12 and a reference end of the stack 14 of mail articles 12. In particular, computing this distance uses the data relating to the thicknesses of the mail articles 12, which data is stored in the database 16.

In step 430, on the basis of the distance d and of the distance D, the monitoring and control unit 9 angularly positions the laser 15 so that the laser signal points to the reference article, designated by AR in FIG. 1, so as to designate visually to the operator 5 the location at which the current postal article 3 is to be inserted. For example, the laser signal may be pointed at the top edge face of the reference mail article 12. This laser signal is a light signal that is white, red, or of some other color so as to be readily identified by the operator 5.

In step 440, the operator 5 takes hold of the current postal article 3 in the bin 2 and, merely by moving an arm, inserts it into the stack at the insertion location designated by the laser signal. The data concerning the article 3, and in particular its thickness, is added to the database 16.

A new merging cycle then starts for a new postal article 3 to be merged;

Naturally, the light signal may also be generated by some other laser source without going beyond the ambit of the invention. Instead of using physical magnitudes that are measured for the mail articles 12, in particular measured thicknesses, the monitoring and control unit 9 may be adapted to estimate the distance d on the basis of a standard thickness for the mail articles 12. Naturally, the merging location, or the reference mail article 12, is then designated approximately.

Naturally, as the postal articles 3 are merged into the stack 14 of mail articles 12, the monitoring and control unit 9 determines, every time, a new distance D, and, by taking the difference, the thickness of the postal article 3 that has been merged.

The monitoring and control unit 9 may be designed to detect, by comparing two successive images taken by the first camera 8, the change in current postal article 3 at the top of the stack 4 so that the merging cycles follow on from one another without any interruption.

It can be understood that the container 2 is preferably placed in the vicinity of the support 11 in order to facilitate handling by the operator 5.

It is also possible to consider displaying the image of the reference mail article 12 on the screen 10 for each merging cycle. In addition, it is also possible to consider displaying the image of the stack 14 of mail articles 12 on the screen 10 in three dimensions (3D) with the identification signal. It is also possible to use virtual reality glasses or goggles with which the image of the stack 14 is superimposed on the direct view seen by the operator 5.

It is understood that, when the merging process starts, the stack of mail articles already put in place by the operator 5 on the support 11 is correctly positioned relative to a three-dimensional reference frame.

It is also understood that the keyboard of the monitoring and control unit 9 may serve to input indications for evaluating the delivery addresses of the postal articles 3 if it has not been possible for them to be read automatically.

Finally, it is understood that the merging method of the invention is compatible with the postal articles 3 previously passing through an encoding or sorting machine, during which pass their destination addresses have been evaluated, and then stored in a database in relation either to image signatures of the postal articles 3 or to bar codes of the ID tag type that have then been printed on said articles. In which case, the step 400 of the processing described above is supplemented by generating an image signature (or by reading back the ID tag bar code), and by accessing the database in order to retrieve the destination address and in order to continue the step 410.

Figure 2:
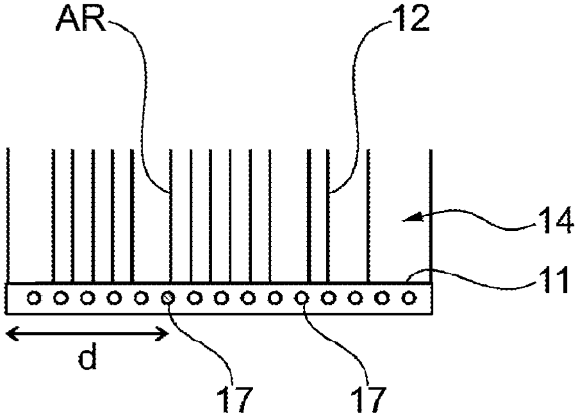
FIG. 2 shows another implementation of the merging method of the invention.

FIG. 2 shows another embodiment of the merging-assistance apparatus 1 that uses a support 11 for supporting a stack 14, which support is provided with a strip of LEDs 17 that can be selectively switched on or off by the monitoring and control unit 9. This strip replaces the laser 15 in its function of designating the location at which a postal article 3 is to be inserted. As can be seen in FIG. 2, the LEDs 17 are lined up along the length of the stack of mail articles 12 disposed on edge. Therefore, the monitoring and control unit 9 causes the LED that is positioned facing the reference mail article AR to be switched on. In FIG. 2, this LED is symbolized by a black circle.

The invention makes it possible to achieve the above-mentioned objectives. The identification signal physically and directly designating the insertion location makes it possible to accelerate the rate at which the flows of postal articles are merged by the operator 5.

Naturally, the present invention is in no way limited to the above description of one of its implementations, which can undergo modifications without going beyond the ambit of the invention.

The invention claimed is:

1. An automatic sorting machine for merging a postal article arriving in a stack and on edge in an ordered sequence of mail articles, wherein said automatic sorting machine comprises an image-taking apparatus for forming a digital image of said postal article including a postal delivery address, a monitoring and control processor for determining in said ordered sequence of mail articles a location at which said postal article is to be inserted in order to perform the merging on the basis of data produced in said sorting machine and of said digital image, and identification means controlled by the monitoring and control processor for generating an identification signal that visually designates said location directly in the stack so as to assist an operator with performing said merging, said identification signal being generated on the basis of data representative of the thickness of each mail article produced by said sorting machine, wherein said identification signal is a light signal and further including a light source of the laser source type disposed substantially above the mail articles, said light signal being aimed at one of the mail articles marking said insertion location.

2. The automatic sorting machine according to claim 1, wherein at least one physical magnitude of said stack is used to generate said identification signal.

3. The automatic sorting machine according to claim 1, further including wherein a strip of LEDs along which the mail articles are disposed on edge and in a stack, a LED emitting said light signal marking said location in the stack.

4. The automatic sorting machine according to claim 1, wherein said postal article is merged with mail articles in order to prepare a delivery round.

5. The automatic sorting machine according to claim 1, wherein on the basis of each digital image of a postal article, an image signature serving as a unique identifier for uniquely identifying said postal article is computed.

* * * * *